(12) United States Patent
Tomita et al.

(10) Patent No.: US 11,112,344 B2
(45) Date of Patent: Sep. 7, 2021

(54) PARTICLE MEASURING METHOD AND DETECTION LIQUID

(71) Applicants: Kioxia Corporation, Tokyo (JP); RION Co., Ltd., Tokyo (JP)

(72) Inventors: Hiroshi Tomita, Yokkaichi Mie (JP); Hidekazu Hayashi, Yokkaichi Mie (JP); Eishi Shiobara, Yokohama Kanagawa (JP); Kaoru Kondo, Tokyo (JP); Takuya Tabuchi, Tokyo (JP); Kazuna Bando, Tokyo (JP); Sota Kondo, Tokyo (JP)

(73) Assignees: Kioxia Corporation, Tokyo (JP); Rion Co., Ltd., Tokyo (JP)

( * ) Notice: Subject to any disclaimer, the term of this patent is extended or adjusted under 35 U.S.C. 154(b) by 0 days.

(21) Appl. No.: 16/807,459

(22) Filed: Mar. 3, 2020

(65) Prior Publication Data

US 2020/0284714 A1 Sep. 10, 2020

(30) Foreign Application Priority Data

Mar. 8, 2019 (JP) .............................. JP2019-043031

(51) Int. Cl.
*G01N 15/14* (2006.01)
*G01N 15/02* (2006.01)
(Continued)

(52) U.S. Cl.
CPC ..... *G01N 15/1429* (2013.01); *G01N 15/0266* (2013.01); *G01N 15/1404* (2013.01);
(Continued)

(58) Field of Classification Search
CPC ........... G01N 24/088; G01N 33/54326; G01N 33/70; G01N 33/9493; G01N 15/0266;
(Continued)

(56) References Cited

U.S. PATENT DOCUMENTS 6,541,213 B1 *  4/2003  Weigl ................... B01F 5/0403
                                                    210/198.2
9,823,190 B2 * 11/2017  Minakami .............. G01N 21/53
(Continued)

FOREIGN PATENT DOCUMENTS

JP         2008-256537 A    10/2008
JP         5719473 B1        5/2015
(Continued)

OTHER PUBLICATIONS

Tomita, "Promotion of standardization of submerged particulate filter for semiconductor industry," SEMI News, vol. 27, No. 4, pp. 8-9 (2011).

*Primary Examiner* — Michael P Stafira
(74) *Attorney, Agent, or Firm* — Finnegan, Henderson, Farabow, Garrett & Dunner L.L.P.

(57) ABSTRACT

According to one embodiment, a particle measuring method is disclosed. The method includes irradiating a detection liquid with light. The detection liquid contains methyl salicylate. The method further includes converting scattered light from the detection liquid into an electric signal by using photoelectric conversion after irradiating the detection liquid with the light. The method further includes performing a particle measurement on the detection liquid by using the electric signal.

15 Claims, 7 Drawing Sheets

(51) Int. Cl.
*G01N 21/53* (2006.01)
*G01N 15/00* (2006.01)

(52) U.S. Cl.
CPC ......... *G01N 21/53* (2013.01); *G01N 2015/03* (2013.01); *G01N 2201/067* (2013.01)

(58) Field of Classification Search
CPC ........... G01N 15/1404; G01N 15/1429; G01N 15/1459; G01N 2015/03; G01N 21/53; G01N 2201/067; G01N 2800/168; G01N 33/48; G01N 33/5091; G01N 33/6854; G01N 2800/7028; G01N 33/53; G01N 33/5743; G01N 15/0211; G01N 1/30; G01N 2015/0053; G01N 2015/0222; G01N 2015/0693; G01N 2333/4716; G01N 2333/96433; G01N 27/026; G01N 2800/085; G01N 2800/164; G01N 2800/50; G01N 2800/7052; G01N 33/2888; G01N 33/532; G01N 33/533; G01N 33/536; G01N 33/563; G01N 33/564; G01N 33/57423; G01N 33/582; G01N 33/94; G01N 2800/52; G02B 5/3016; G02B 5/3025
See application file for complete search history.

(56) References Cited

U.S. PATENT DOCUMENTS

| 2008/0154023 | A1* | 6/2008 | Nichols | A61K 39/39591 530/387.3 |
| 2008/0246963 | A1* | 10/2008 | Nakajima | G01N 15/0205 356/336 |
| 2008/0274905 | A1* | 11/2008 | Greene | G01N 21/6428 506/4 |
| 2012/0196320 | A1* | 8/2012 | Seibel | G01N 1/30 435/40.52 |
| 2018/0120214 | A1* | 5/2018 | Kato | G01N 15/10 |

FOREIGN PATENT DOCUMENTS

| JP | 2018-179971 A | 11/2018 |
| WO | WO 2016/159131 A1 | 10/2016 |

* cited by examiner

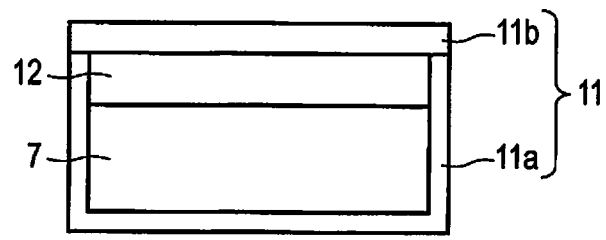
F I G. 8
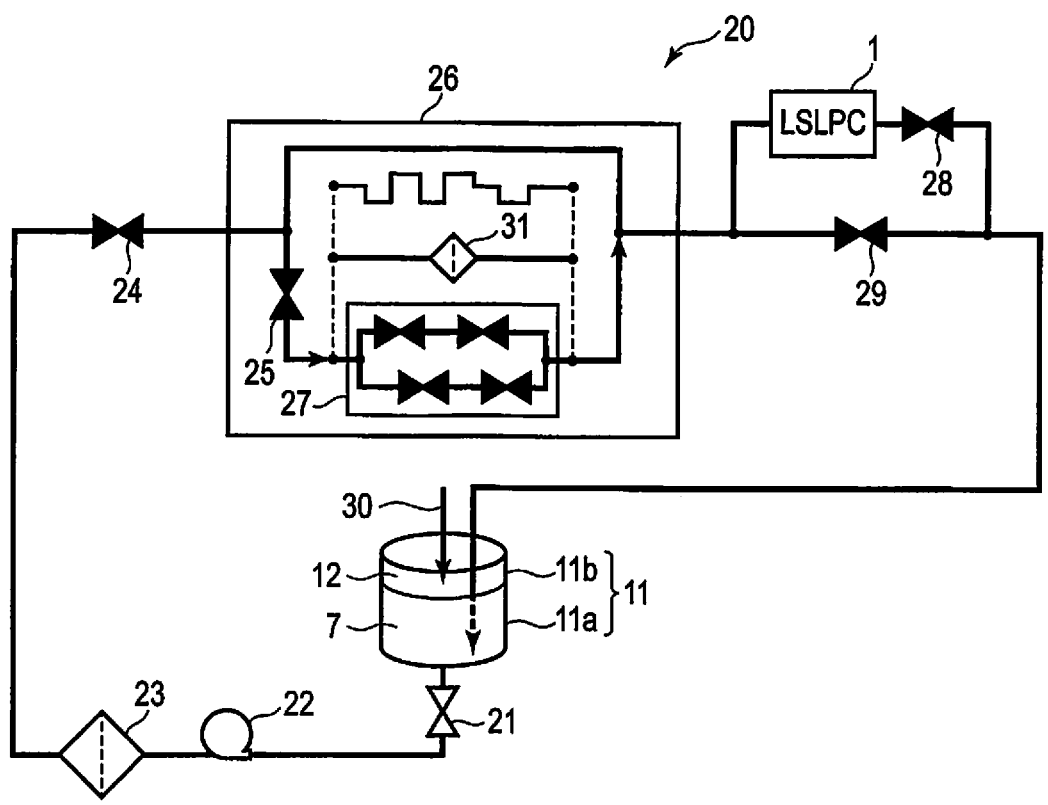
F I G. 9

PARTICLE MEASURING METHOD AND DETECTION LIQUID

CROSS-REFERENCE TO RELATED APPLICATIONS

This application is based upon and claims the benefit of priority from Japanese Patent Application No. 2019-043031, filed Mar. 8, 2019, the entire contents of which are incorporated herein by reference.

FIELD

Embodiments described herein relate generally to a particle measuring method and detection liquid.

BACKGROUND

As one of methods of measuring particles in a liquid, there is a method using a light scattering liquid particle counter (LSLPC). In this method, the liquid is irradiated with light, then scattered light from each of particles in the liquid is detected, and size and number of the particles in the liquid are measured based on the detected scattering light.

BRIEF DESCRIPTION OF THE DRAWINGS

FIG. 8 is a view schematically showing a tank that stores a detection liquid containing a methyl salicylate subjected to nitrogen gas sealing.

FIG. 9 is a view schematically showing an example of a liquid-borne particle measuring system including the tank of FIG. 8.

DETAILED DESCRIPTION

Figure 1:
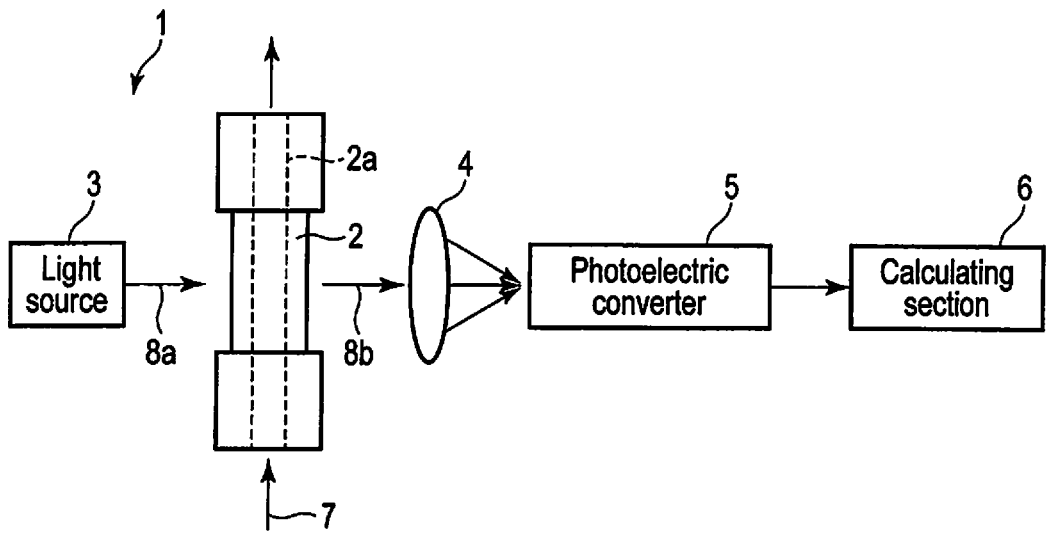
FIG. 1 is a view schematically showing an LSLPC used for performing a particle measuring method of an embodiment.

In general, according to one embodiment, a particle measuring method is disclosed. The method includes irradiating a detection liquid with light. The detection liquid contains a methyl salicylate. The method further includes converting scattered light from the detection liquid into an electric signal by using photoelectric conversion after irradiating the detection liquid with the light. The method further includes performing a particle measurement on the detection liquid by using the electric signal.

Embodiments will be described hereinafter with reference to the accompanying drawings. The drawings are schematic or conceptual drawings, and dimensions and ratios are not necessarily the same as those in reality. Further, in the drawings, the same reference symbols (including those having different subscripts) denote the same or corresponding parts, and overlapping explanations thereof will be made as necessary. In addition, as used in the description and the appended claims, what is expressed by a singular form shall include the meaning of "more than one."

In the present embodiment, a particle measuring method will be described, which measures particles (generated dust) from a part to be in contact with an ultrapure liquid that is used for manufacturing semiconductor devices.

The part is, for example, a pipe, a pipe joint, a valve, a pump or a filter.

A material of the part is a component of, for example, a fluororesin such as PFA (perfluoroalkoxy alkane: copolymers of tetrafluoroethylene ($C_2F_4$) and perfluoroethers ($C_2F_3OR^f$, where $R^f$ is a perfluorinated group such as trifluoromethyl ($CF_3$))), or PTFE (polytetrafluoroethylene).

The ultrapure liquid is a liquid including, for example, ultrapure water, isopropyl alcohol (IPA), acidic cleaning liquid, alkaline cleaning liquid, organic solvent, or the ultrapure liquid is a liquid including material for a functional coating film such as resist or the like.

FIG. 1 is a view schematically showing an LSLPC 1 used for performing a particle measuring method of an embodiment.

The LSLPC 1 includes a flow cell 2, light source 3, condensing lens 4, photoelectric converter 5, and calculating section 6.

Detection liquid 7 flows through a flow path 2a of the flow cell 2. The detection liquid is a liquid in which particles disperse. The light source 3 includes a laser element (not shown), and the detection liquid 7 flowing through the fluid channel 2a is irradiated with laser light (irradiation light) 8a generated from the laser element. In the present embodiment, the laser element is a laser diode pumped solid-state laser element, and a wavelength of the laser light 8a is 532 nm. When a particle exists in the detection liquid 7, the laser light 8a is scattered by the particle. Scattered light 8b from the particle in the detection liquid 7 irradiated with the laser light 8a is condensed on the photoelectric converter 5 by the condensing lens 4. The photoelectric converter 5 converts the condensed scattered light 8b into an electric signal by photoelectric conversion. In the present embodiment, the photoelectric converter 5 includes a photodiode which is a photoelectric conversion element.

The calculating section 6 measures the particles contained in the detection liquid 7 based on the electric signal (output) of the photoelectric converter 5. More specifically, the calculating section 6 calculates the number of particles based on the number of pulse waves in the electric signal (output) of the photodiode. The number of the pulse waves corresponds to the number of the particles. Further, amplitude of the pulse wave is proportionate to scattered light intensity of the particle, thereby obtaining information of size of the particle (particle size). This particle size is a relative equivalent value calibrated by a test particle (e.g., polystyrene latex (PSL) particle) of which refractive index and particle size are known.

Figure 2:
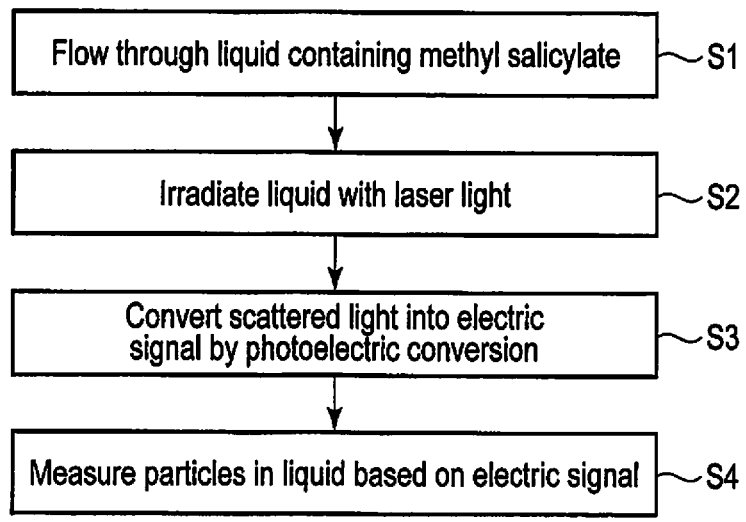
FIG. 2 is a flowchart for explaining a particle measuring method of an embodiment.
Figure 3:
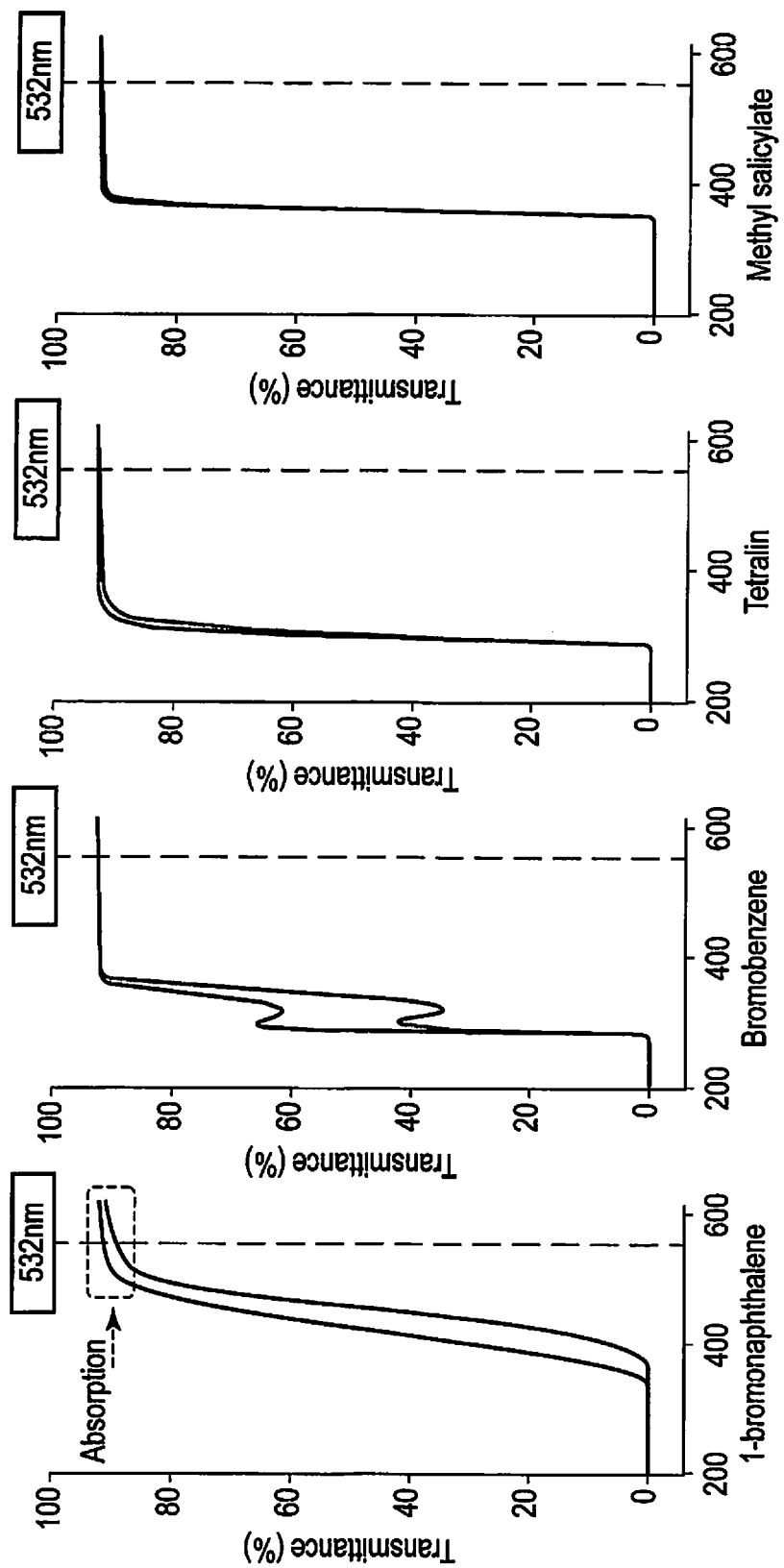
FIGS. 3A, 3B, 3C and 3D are views showing analysis results of transmittance of 1-bromonaphthalene, bromobenzene, tetralin and methyl salicylate.

FIG. 2 is a flowchart for explaining the particle measuring method of an embodiment.

First, the detection liquid 7 containing a methyl salicylate is made to flow through the flow path 2a of the flow cell 2 (step S1). The detection liquid 7 flows through, for example, parts 27 of a liquid-borne particle measuring system 20 shown in FIG. 9, FIG. 10A, and FIG. 10B which will be described later, and thereafter the detection liquid 7 flows through the flow path 2a of the flow cell 2 of the LSLPC 1.

Next, the detection liquid 7 flowing through the flow path 2a is irradiated with the laser light (irradiation light) 8a (step S2).

Next, the photoelectric converter 5 is used to convert the scattered light 8b into an electric signal by photoelectric conversion (step S3).

Thereafter, particles contained in the detection liquid 7 are measured by the calculating section 6 based on the electric signal (step S4).

Noted that the particle measuring method of the embodiment can be performed by using a dynamic light scattering (DLS) type particle size distribution measuring device or a particle measuring device (flow particle tracking (FPT) in place of LSLPC 1. The particle measuring device (FPT) is disclosed in WO 2016/159131, which measures the particle size or the like based on displacement amount of a particle by the Brownian movement. Further, when the alternative devices are used, in a process corresponding to the step S4, the calculating section 6 calculates the particle size distribution of the particles in the detection liquid based on a change in the amplified electric signal, i.e., based on the Brownian movement of the particle assemblage in the detection liquid.

Next, the reason why the detection liquid 7 containing methyl salicylate is used will be described below.

The scattering of light closely relates to the particle size and wavelength of the light to be used for particle measurement. When the particle size is close to the wavelength of the light, the theory of Mie scattering is applied. In the wavelength region (Mie resonance region) to which the Mie scattering is applied, a relation between the particle size and the scattered light intensity due to the particle becomes complicated.

Further, when the particle size is sufficiently larger than the wavelength of the light, the diffraction phenomenon becomes predominant, and the scattered light intensity is proportional to the square of the particle size. On the other hand, when the particle size is much smaller than the wavelength of the light, it is known that the scattered light intensity is expressed by Rayleigh scattering.

The following equation (1) indicates the relative scattered intensity equation of Rayleigh scattering.

$$I_P = I_0 \frac{\pi^4 d^6}{8R^2\lambda^4} \left( \frac{\left(\frac{m}{n}\right)^2 - 1}{\left(\frac{m}{n}\right)^2 + 2} \right)^2 (1 + \cos^2\theta) \quad (1)$$

$I_P$: scattered light intensity, $I_0$: irradiation light intensity, $\lambda$: wavelength, d: particle size, R: observation distance, $\theta$: scattering direction, m: refractive index of particle, n: refractive index of solvent.

The relative scattered intensity closely relates to the refractive index (n) of the solvent and the refractive index (m) of the particle which is the dispersed material. That is, the equation (1) suggests that when the refractive index (n) of the solvent and the refractive index (m) of the particle are the same or nearly the same, sufficient scattering intensity for detecting a particle cannot be obtained.

More specifically, when the particle of fluororesin (refractive index is about 1.35) is measured in ultrapure water (refractive index is about 1.33), the refractive index of the particle of the fluororesin is similar to the refractive index of the ultrapure water, so that it is difficult to detect the particle of the fluororesin in the ultrapure water by using the light scattering phenomenon. Accordingly, it is difficult to detect the particle of the fluororesin generated from the part by using the light scattering phenomenon. In the conventional LSLPC, the detection limit size of the fluororesin particle in the ultrapure water is about 70 nm.

However, the scattered intensity equation (1) suggests that even when the particle of fluororesin with a minute particle size that cannot be detected by using water as a solvent, it is possible to detect the particle of fluororesin with the minute particle size by using a solvent having an appropriate high refractive index.

Thus, as a solvent for detecting a fine particle such as a fluororesin or the like, which has a refractive index similar to the refractive index of ultrapure water or isopropyl alcohol (IPA), four materials as shown in Table 1, methyl salicylate, tetralin, bromobenzene, and 1-bromonaphthalene are selected among the materials having high refractive indices (1.43 to 1.66) from the viewpoints of the handleability (safety) and thermal stability (preservation stability), as shown in Table 1. In Table 1, the refractive indices of the case where the sodium D line is used are shown.

TABLE 1

| Structure | Refractive index (D line) | Boiling point (° C.) | Melting point (° C.) | Vapor pressure (Pa: 25° C.) | Density (g/cm³) | Viscosity (cP) |
| --- | --- | --- | --- | --- | --- | --- |
| 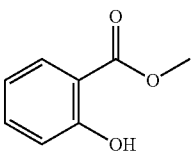 Methyl salicylate | 1.5369 | 223.3 | −8.6 | 6 | 1.1831 (20° C.) | No data |

TABLE 1-continued

| Structure | Refractive index (D line) | Boiling point (° C.) | Melting point (° C.) | Vapor pressure (Pa: 25° C.) | Density (g/cm³) | Viscosity (cP) |
|---|---|---|---|---|---|---|
| 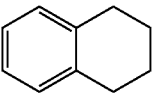 Tetralin | 1.5413 | 207.65 | −35.749 | 50 | 0.97 | 2.02 (25° C.) |
|  Bromobenzene | 1.5597 | 156.06 | −30.6 | 550 | No data | 1.13 (20° C.) |
| 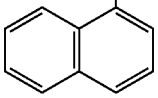 1-bromonaphthalene | 1.6587 | 281.2 ~ 281.6 | 6.1 | No data | 1.4826 (20° C.) | 5.993 (15° C.) |

The above-mentioned four materials were analyzed with respect to physical properties, which are absorption/fluorescence, viscosity, density, and isothermal compressibility necessary for measurement conditions. The ultraviolet-visible transmittance spectrums of the above four materials were investigated. Here, two cells, which are different in optical path through which light passes, are used to investigate wavelength dependence of the transmittance of the respective above four materials, and the investigated results are shown in FIGS. 3A to 3D. From the results of the analyses of the transmittance of FIGS. 3A to 3D, it can be seen that the absorption phenomenon is observed in only 1-bromonaphthalene in the vicinity of 532 nm wavelength. It is because if the absorption does not occur, the same wavelength dependences of the transmittance are obtained by the two cells which are different in the optical path. In FIGS. 3A to 3D, the axis of abscissa indicates the wavelength (nm).

Figure 4:
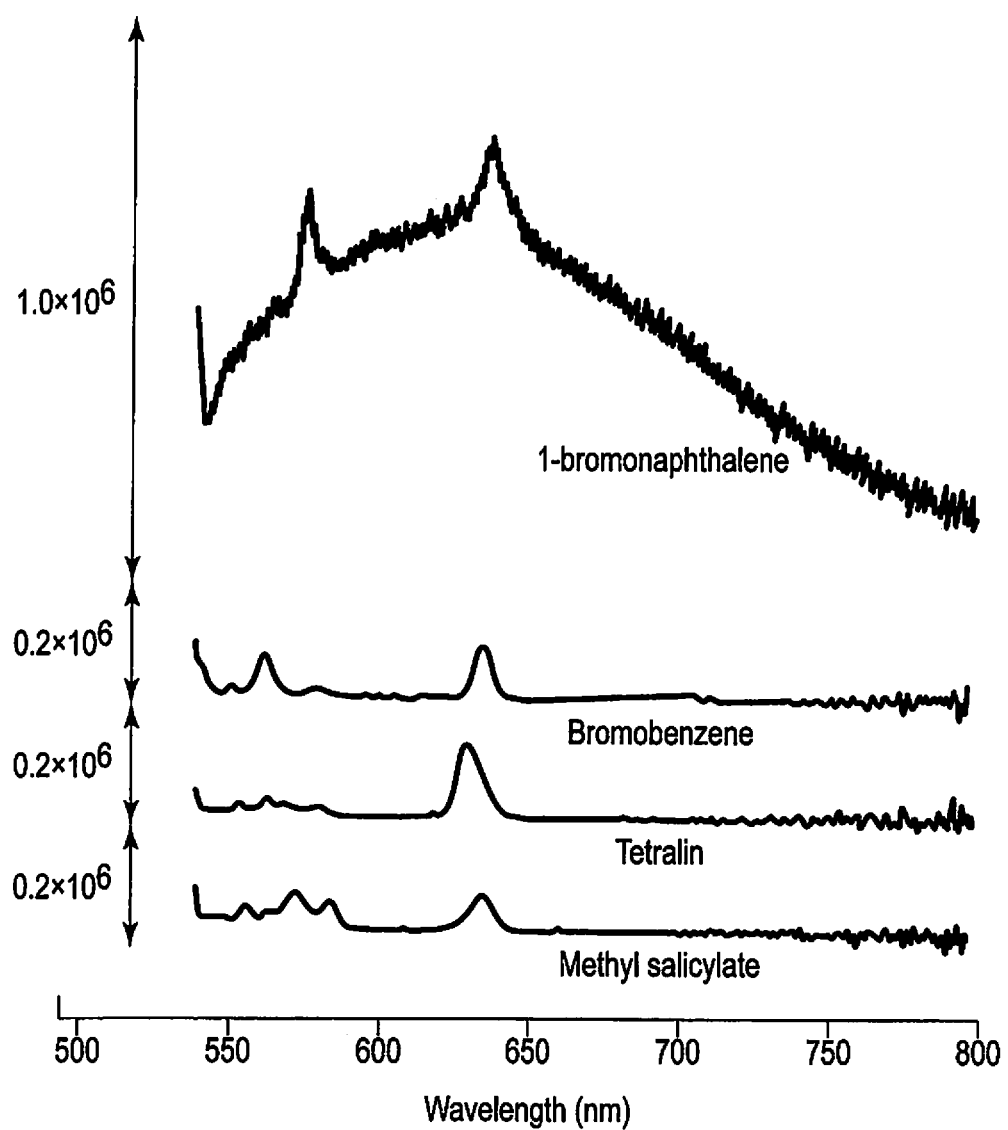
FIG. 4 is a view showing a result of emission spectral analysis of 1-bromonaphthalene, bromobenzene, tetralin and methyl salicylate.

In addition, light emission spectrum (excitation wavelength 532 nm) of the respective four materials was analyzed. The result is shown in FIG. 4. As shown in FIG. 4, with respect to 1-bromonaphthalene, a strong light emission was observed in the whole range of the analysis wavelength, and with respect to bromobenzene, light emission was slightly observed in the vicinity of the excitation wavelength. With respect to tetralin and methyl salicylate, light emission was hardly observed. Noted that the axis of ordinate indicates the emission intensity normalized by the excitation light intensity of each wavelength.

From the above results, it is found that when the LSLPC using the laser diode pumped solid-state laser element with the wavelength equal or close to 532 nm is employed, 1-bromonaphthalene is not suitable for a solvent as the detection liquid (detection standard solution) since 1-bromonaphthalene is confirmed to show phenomenon of the light absorption/light emission. It is also found that bromobenzene is not suitable for standard detection liquid since the light emission phenomenon is observed.

Next, with respect to methyl salicylate and tetralin, results of comparative investigation of health hazard, environmental hazard, hazardous information and the like are shown in Table 2 below.

TABLE 2

| | Methyl salicylate | Tetralin |
|---|---|---|
| Chemical formula | 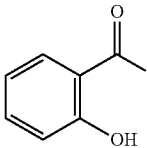 |  |
| Refractive index (D line) | 1.537 | 1.541 |
| Boiling point (° C.) | 223.3 | 207.7 |
| Flashpoint (° C.) | 99.0 | 71.0 |
| Vapor pressure (mmHg: ° C.) | 0.11(25° C.) | 1(38° C.) |
| Density (g/cm³) | 1.183 | 0.970 |
| Viscosity (cP) | 3.0 | 2.0 |
| GHS classification |  |  |

TABLE 2-continued

|  | Methyl salicylate | Tetralin |
|---|---|---|
| Physicochemical hazardous object | Class 4 petroleum No. 3 (non-aqueous) | Class 4 petroleum No. 3 (non-aqueous) |
| Health hazard | Acute toxicity (oral): category 4 | Acute toxicity (inhalation): category 2 |
|  | Skin corrosion/irritation: category 2 | Skin corrosion/irritation: category 2 |
|  | Serious eye damage/eye irritation: category 2A |  |
|  | — | Specific target organ systemic toxicity (single exposure): category 3 (anesthetic action) |
|  | — | Specific target organ systemic toxicity (repeated exposure): category 2 (blood) |
| Environmental hazard | — | Hazard to the aquatic environment (acute): category 2 |
| Hazard and toxicity information | Swallowing is hazardous | Inhalation is hazardous to life (vapor) |
|  | Irritation of skin | Irritation of skin |
|  | Strong eye irritation | Possibility of sleepiness or dizziness being caused |
|  | — | Possibility of organ injury being caused by long-period or repeated exposure |
|  | — | Toxic to aquatic life |
| Particular mention | Existing in plants Low concentration thereof is used as a food additive (flavor) |  |

From Table 2, it is found that tetralin is less suitable than methyl salicylate as a standard detection solvent from the viewpoints of health hazard, environmental hazard, hazardous information and the like.

From the results of the investigation, methyl salicylate (refractive index: 1.537) is suitable as a detection liquid for detecting the particles of fluororesin in the liquid by light scattering method.

Figure 5:
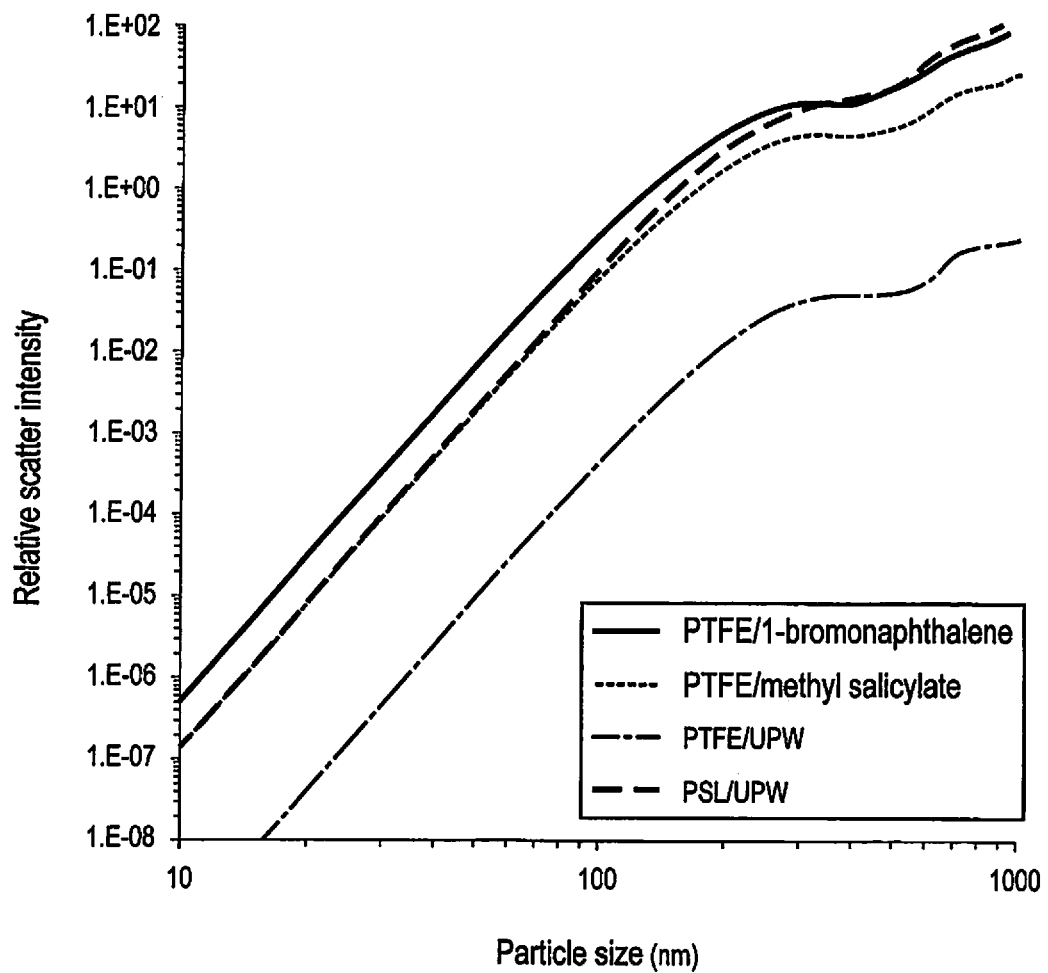
FIG. 5 is a graph showing a result of investigation on a relation between particle size of a particle in a solvent and relative scatter intensity.

FIG. 5 is a graph showing a result of investigation on a relation between a particle size (particle diameter) of particles in a solvent and relative scattered intensity. In FIG. 5, on the right side and left side of the slash (/), a solvent name and particle name are shown, respectively. Noted that each of the results of FIG. 5 indicates a simulation value or actual measured example.

The refractive index of 1-bromonaphthalene is 1.659, the refractive index of methyl salicylate is 1.537, the refractive index of ultrapure water (UPW) is 1.333, the refractive index of polystyrene latex (PSL) is 1.595, and the refractive index of polytetrafluoroethylene (PTFE) is 1.35. In general, calibration of apparatuses, which measure liquid-borne particles, are carried out by using PSL particles in UPW.

From FIG. 5, it can be seen that the value of the relative scattered intensity of the PSL particle with diameter 30 nm in UPW is about $1.0 \times 10^{-4}$, the value of relative scattered intensity of the PTFE particle with diameter 75 nm in UPW is about $1.0 \times 10^{-4}$, and both the relative scatter intensities are nearly the same.

Further, from FIG. 5, it can be seen that both the value of the relative scattered intensity of the PSL particle with 30 nm particle diameter in UPW and the value of relative scattered intensity of the PTFE particle with 30 nm particle diameter in methyl salicylate are about $1.0 \times 10^{-4}$, and the relative scattered intensity of the PTFE particle with 25 nm particle diameter in 1-bromonaphthalene is about $1.0 \times 10^{-4}$. That is, by comparing the particle measuring method using UPW and the particle measuring method using methyl salicylate, the particle measuring method using methyl salicylate can obtain greater relative scattered intensity (detection sensitivity) when the particle diameter of fluororesin particle which is the detection target is the same in the both methods, and the particle measuring method using methyl salicylate can detect smaller particles when the relative scattered intensity (detection sensitivity) necessary for the detection is the same in the both methods.

Next, a refractive index, isothermal compressibility, and relative intensity of fluctuating light scattering (where relative intensity of water is set as 1.0) of each of various types of liquid are shown in Table 3. Values of the relative intensity are those obtained based on the Einstein's relational expression (equation 2).

$$I_E = I_0 \frac{\pi^2}{9R^2\lambda^4} \frac{(n^2-1)^2(n^2+2)^2}{n^4} KT\beta \qquad (2)$$

$I_E$ indicates scatter intensity of the liquid, $I_0$ indicates light intensity, R indicates observation distance, $\lambda$ indicates wavelength, T indicates absolute temperature, n indicates refractive index of the medium, $\beta$ indicates isothermal compressibility, and K indicates Boltzmann's constant.

TABLE 3

| Liquid material | Refractive index | Isothermal compressibility ($10^{-11}$ Pa$^{-1}$) | Relative intensity* of fluctuating light scattering |
|---|---|---|---|
| Water | 1.333 | 4.6 | 1.0 |
| Acetone | 1.358 | 12.4 | 3.3 |
| Methanol | 1.329 | 12.6 | 2.6 |
| Ethylene glycol | 1.426 | 3.7 | 1.7 |
| Hexane | 1.374 | 16.1 | 4.9 |
| Heptane | 1.387 | 14.2 | 4.8 |
| Octane | 1.397 | 12 | 4.4 |

TABLE 3-continued

| Liquid material | Refractive index | Isothermal compressibility ($10^{-11}$ Pa$^{-1}$) | Relative intensity* of fluctuating light scattering |
|---|---|---|---|
| Ethyl alcohol | 1.331 | 11.1 | 2.4 |
| Glycerin | 1.450 | 2.1 | 1.1 |
| Toluene | 1.497 | 8.6 | 6.5 |
| IPA | 1.374 | 9.3 | 2.9 |
| 1-bromo-naphthalene | 1.658 | 48.8 | 98.4 |
| Bromobenzene | 1.559 | 69.3 | 78.3 |
| Tetralin | 1.541 | 61.4 | 61.9 |
| Methyl salicylate | 1.537 | 53.6 | 52.5 |

*Where relative intensity of water is set as 1.0

What is found from Table 3 is that the liquid exhibits light scattering (background scattering) which arises from the liquid itself and is associated with the isothermal compressibility and refractive index, and the light scattering has an influence on the minimum detectable particle size (minimum detectable sensitivity) of the particle in the liquid. More specifically, when measurement is carried out by using the LSLPC, the intensity of the light scattering from the methyl salicylate itself is about 50 times greater than the intensity of the light scattering from the ultrapure water itself. The intensity of the light scattering from the toluene itself is 6.5 times as great as the intensity of the light scattering from the ultrapure water itself. The detection limit of the PTFE particle in each of UPW, methyl salicylate, and toluene is calculated in consideration of the light scattering from the liquid itself, and as a result, the detection limit of the PTFE particle in the UPW is about 75 nm, the detection limit of the PTFE particle in the methyl salicylate is 40 nm, and the detection limit of the PTFE particle in the toluene is 45 nm.

Incidentally, it is revealed that when a methyl salicylate is left opened to the atmosphere, the methyl salicylate becomes cloudy and thereby adversely affecting the particle measurement. The reason of the clouding of methyl salicylate is conceived as follows. Methyl salicylate is a water-insoluble liquid. However, when the methyl salicylate is left opened to the atmosphere, a moisture concentration of the methyl salicylate is increased. The increasing of the moisture concentration causes particulate moisture in the methyl salicylate.

Figure 6:
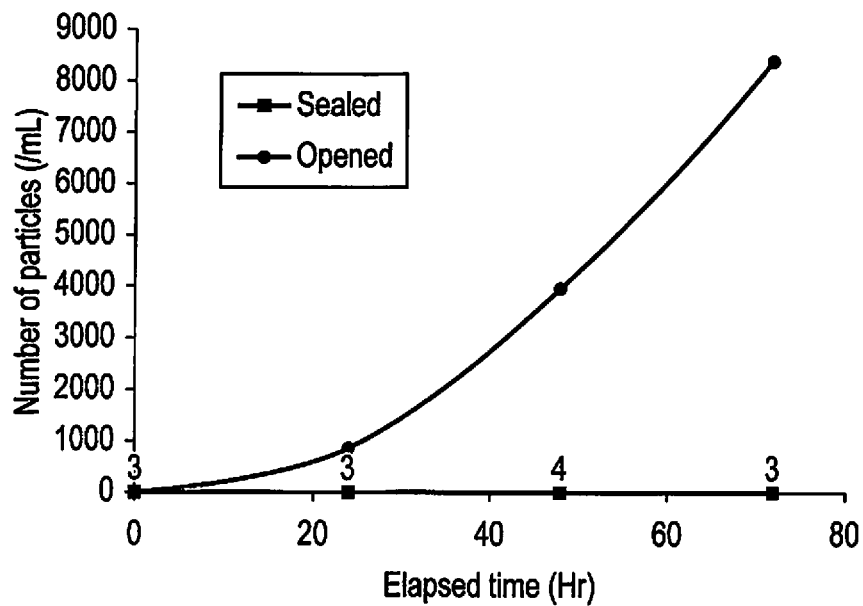
FIG. 6 is a view showing a result of investigation on a relation between the number of particles in methyl salicylate and elapsed time for each of methyl salicylate left opened to atmosphere and methyl salicylate sealed in a container.

FIG. 6 is a view showing a relation between the number of particles in methyl salicylate left opened to the atmosphere and elapsed time (left time), and a relation between the number of particles in methyl salicylate sealed in a container and elapsed time. The measurement of the number of particles is carried out when the elapsed time is 24 hours, 48 hours and 72 hours by using the LSLPC. The target of the measurement is particles having particle size of 0.2 µm or more. Noted that the data concerning the case where the methyl salicylate is left opened to the atmosphere is a difference between the number of particles in the methyl salicylate left opened to the atmosphere and the number of particles in the ultrapure water left opened to the atmosphere. Further, the data concerning the case where the methyl salicylate is sealed in the container is the measured value of the number of particles in the methyl salicylate sealed in the container, and is not a difference between the number of particles in methyl salicylate sealed in the container and the number of particles in ultrapure water sealed in the container.

From FIG. 6, it can be seen that the number of particles in the methyl salicylate left opened to the atmosphere is obviously increases with the lapse of time. On the other hand, when the methyl salicylate is sealed in the container, it can be seen that the number of particles is suppressed from increasing.

Figure 7:
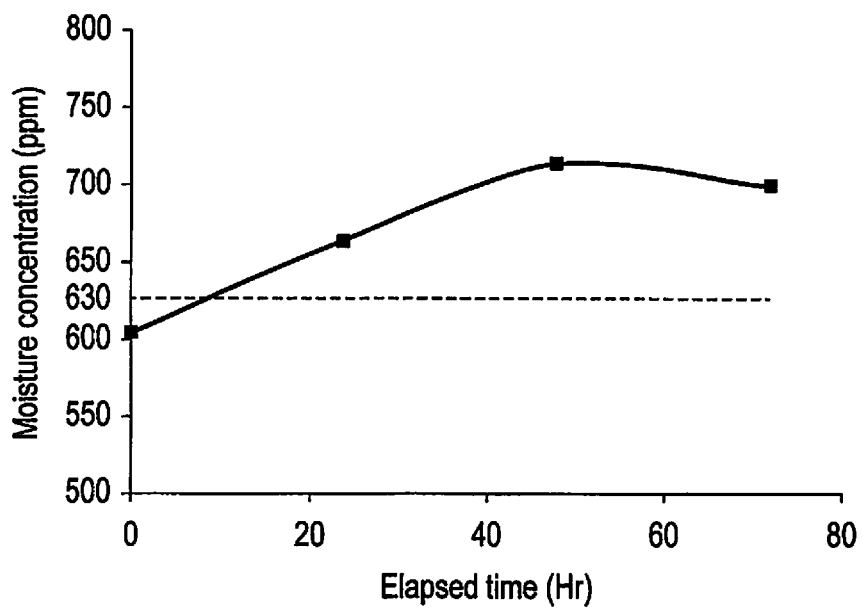
FIG. 7 is a view showing a result of investigation on a relation between a moisture concentration in methyl salicylate left opened to atmosphere and elapsed time.

FIG. 7 is a view showing a relation between a moisture concentration in methyl salicylate left opened to the atmosphere and elapsed time (left time). The measurement of the moisture concentration was carried out when the elapsed time was 24 hours, 48 hours, and 72 hours.

From FIG. 7, it can be seen that the moisture concentration of the methyl salicylate left opened to the atmosphere increases, and the moisture concentration increases to a value greater than the saturated moisture solubility (630 ppm) of methyl salicylate.

From the results described above, it has become clear that particulate micelles causing the light scattering are formed in the methyl salicylate by the moisture in the atmosphere, and the moisture is dissolves in the methyl salicylate in such a manner as to reach or exceed the supersaturation concentration.

This phenomenon is the cause of clouding of the methyl salicylate, and brings about an increase in the background scattering. The background scattering decreases the detection sensitivity of the particles in the liquid. Accordingly, it is necessary to take a countermeasure against mixing of moisture into methyl salicylate.

Thus, in the present embodiment, the part (e.g., a tank for storing methyl salicylate) to be an atmospheric open system for the methyl salicylate is subjected to ultrapure nitrogen gas sealing. For example, as shown in FIG. 8, a region (space) of container 11a of a tank 11, which is not filled with detection liquid 7 containing methyl salicylate, is filled with nitrogen 12. In FIG. 8, a reference symbol 11b indicates a lid of the tank 11. The nitrogen 12 suppresses entering of the moisture from a gap between the container 11a and lid 11b into the container 11a, thereby suppressing dissolving of the moisture into the methyl salicylate. It is confirmed that the clouding phenomenon of the methyl salicylate can be suppressed by subjecting the tank 11 for storing the detection liquid 7 to the nitrogen sealing. Noted that dry air of which dew point is controlled may be used in place of the nitrogen.

FIG. 9 is a view schematically showing an example of a liquid-borne particle measuring system 20 including the tank 11.

The liquid-borne particle measuring system 20 includes an LSLPC 1, a tank 11, a valve 21, a pump 22, a filter 23, valves 24 and 25, an evaluation module 26, a part 27 which is an evaluation (inspection) target, valves 28 and 29, a supply line 30 of nitrogen gas, and a filter 31. Further, in FIG. 9, bold lines indicate pipes. The part 27 contain fluororesin such as PTFE or the like, and are used to manufacture semiconductor devices that are to be in contact with an ultrapure liquid such as ultrapure water or the like. That is, the part 27 includes, for example, above-mentioned the pipe, the joint, the valve, the pump or the filter. Noted that FIG. 9 shows an example that the number of valves are four In FIG. 9, the opened valve 21 is indicated by an outline valve symbol, and the closed valves 24, 25, 29 and the valves of the part 27 are indicated by solid valve symbols. In FIG. 9, the part 27 is illustrated as a four-valve system.

Figure 10A:
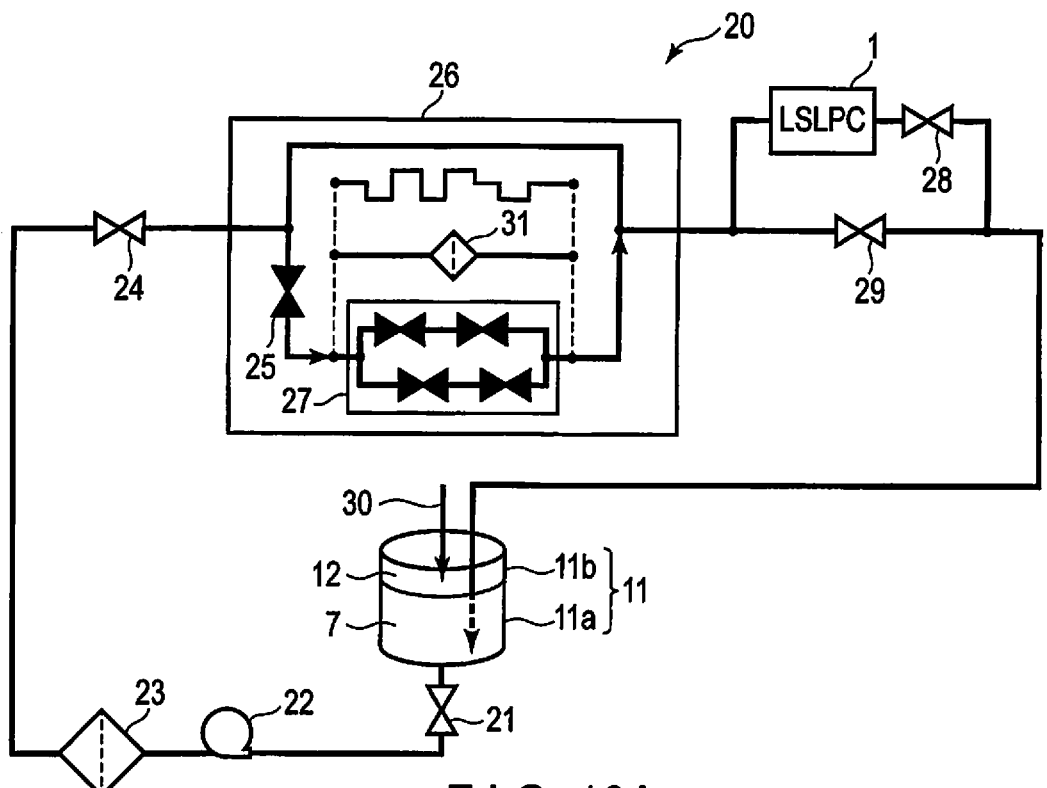
FIGS. 10A and 10B are views showing routes of methyl salicylate flowing through pipes of the liquid-borne particle measuring system of FIG. 8.

In order to investigate particles generated from the part by using the liquid-borne particle measuring system 20, the valve 24, valve 28 and valve 29 are opened, and then the pump 22 is operated, thereby making the detection liquid 7 flow through the pipes and circulation line by a route shown in FIG. 10A. In FIG. 10A, the opened valves are indicated by outline valve symbols and closed valves are indicated by solid valve symbols. The inside of the evaluation module 26 becomes an open state at this stage, the number of particles in the detection liquid 7 is measured by using the LSLPC 1 continuously for a fixed period of time, and when the number of detected particles becomes a stable fixed number, the measured number of the particles is used as the reference value (N1) (background value).

Figure 10B:
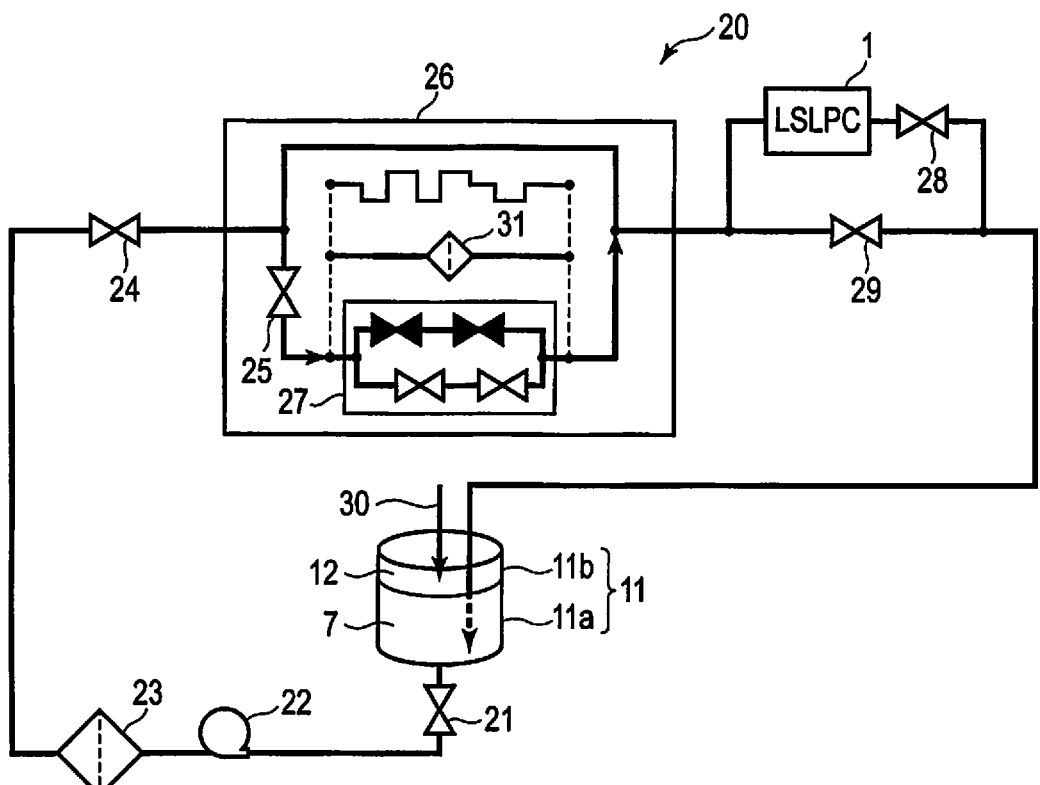

Next, the valve 25 in the evaluation module 26 is also opened, thereby making the detection liquid 7 further flow through the part 27 which is the evaluation (inspection) target by a route shown in FIG. 10B. In FIG. 10B, the opened valves are indicated by outline valve symbols, and closed valves are indicated by solid valve symbols. The member (part 27) desired to examine PTFE particle generation is switched to the circulation system, the detection liquid 7 is made to flow through the part 27, thereby enabling the examination of PTFE generation from the part 27. FIG. 10B shows an example of examination of PTFE generation from the two valves on the lower side of the part 27. At this stage, the number of particles in the detection liquid 7 is continuously measured for a fixed period of time by using LSLPC 1, and the measured number of particles is used as a measured value (N2). The measured value (N2) and the reference value (N1) are compared with each other and, for example, when the value of N2-N1 is within a range of a fixed value, it is determined that the number of particles of the fluororesin generated from the part 27 is within an allowable range.

The following experimental verification was carried out to verify effect of improvement of detection sensitivity of the light scattering from the PTFE particles in the methyl salicylate.

Standard particles for PTFE do not exist, and hence four types of liquids were used, and results of particle size measurement of PTFE particles based on the DLS method on the respective liquids are shown in Table 4. In Table 4, type of solvent, concentration of PTFE particles in the solvent, type of diluent, concentration of PTFE particles in a mixed liquid of the solvent and the diluent, viscosity of the solvent, refractive index of the diluent, and average particle size of detected PTFE particle are shown.

PTFE particles in the solvent (IPA) is high, the average particle size of the detected PTFE particles is 175 nm.

The liquid 2 is a suspension of which solvent is toluene, the concentration of the PTFE particles in the solvent is 30%, diluent is IPA, and (calculated) the concentration of PTFE particles in the mixed liquid of the solvent and diluent is 0.30%. In the case of the liquid 2, the scattered light intensity of PTFE particles is low, and no PTFE can be detected.

The liquid 3 is a suspension of which solvent is toluene, the concentration of the PTFE particles in the solvent is 30%, diluent is toluene, and (calculated) the concentration of PTFE particles in the mixed liquid of the solvent and diluent is 0.30%. In the case of the liquid 3, the average particle size of the detected PTFE particles is 175 nm.

The liquid 4 is a suspension of which solvent is toluene, the concentration of the PTFE particles in the the solvent is 30%, diluent is methyl salicylate, and (calculated) the concentration of PTFE particles in the mixed liquid of the solvent and diluent is 0.30%. In the case of the liquid 4, the average particle size of the detected PTFE particles is 175 nm. Toluene (refractive index 1.491) and methyl salicylate (refractive index 1.5367) are higher in the capability for detecting PTFE particles than pure water (refractive index 1.33) and IPA (refractive index 1.3775). Solvents such as toluene and methyl salicylate, which are capable of securing a refractive index difference, safety, thermal stability and the like, may be used as a detection liquid, however from the viewpoint of the refractive index difference, methyl salicylate is more desirable than toluene.

Although the embodiment has been described with respect to the particle measuring method using the LSLPC, the method can also be performed by means of not only the LSLPC but also a light scattering type particle measuring device such as a dynamic light scattering (DLS) or flow particle tracking (FPT). Regarding FPT, the particle size or the particle size distribution is calculated based on amounts

TABLE 4

|  | Solvent | PTFE concentration | Diluent | PTFE concentration (calculated) | Viscosity (cP) | Refractive index | PTFE average particle size (nm) |
| --- | --- | --- | --- | --- | --- | --- | --- |
| Liquid 1 | Isopropyl alcohol | 20% | No dilution (neat liquid) | 20.0% | 2.0 | 1.3775 | 175 |
| Liquid 2 | Toluene | 30% | 100-fold dilution with IPA | 0.30% | 2.0 | 1.3775 | DLS measurement impossible |
| Liquid 3 | Toluene | 30% | 100-fold dilution with toluene | 0.30% | 0.55 | 1.4910 | 175 |
| Liquid 4 | Toluene | 30% | 100-fold dilution with methyl salicylate | 0.30% | 3.0 | 1.5367 | 175 |

The liquid 1 is a suspension of which solvent is isopropyl alcohol (IPA), and the concentration of the PTFE particles in the solvent is 20%. As with ultrapure water, IPA is liquid used in the manufacturing process of semiconductor devices. In the liquid 1, no diluent is used. In the case of the liquid 1, i.e., in the case where the concentration (20%) of of movement of particles in a detection liquid resulting from Brownian movement of the respective particles in the liquid.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A particle measuring method comprising:
   irradiating a detection liquid whose solvent is a methyl salicylate with light;
   converting scattered light from particles in the detection liquid into an electric signal by using photoelectric conversion after irradiating the detection liquid with the light; and
   performing a particle measurement on the detection liquid by using the electric signal.

2. The particle measuring method of claim 1, wherein the particles include fluororesin.

3. The particle measuring method of claim 2, wherein the fluororesin comprises perfluoroalkoxy alkane (PFA) or polytetrafluoroethylene (PTFE).

4. The particle measuring method of claim 2, wherein the particle measurement comprises calculating the number of the particles based on the number of pulse waves in the electric signal.

5. The particle measuring method of claim 2, wherein the particle measurement comprises calculating a particle size of the particles based on amplitude of pulse waves in the electric signal.

6. The particle measuring method of claim 2, wherein the particle measurement comprises calculating a particle size of the particles based on intensity change of the electric signal resulting from Brownian movement of the particles in the detection liquid.

7. The particle measuring method of claim 2, wherein the particle measurement comprises calculating a particle size distribution of the particles based on intensity change of the electric signal resulting from Brownian movement of the particles in the detection liquid.

8. The particle measuring method of claim 2, wherein the particle measurement comprises calculating a particle size of the particles based on amount of movement of the particles resulting from Brownian movement of the respective particles in the detection liquid.

9. The particle measuring method of claim 2, wherein the particle measurement comprises calculating a particle size distribution of the particles based on amount of movement of the particles resulting from Brownian movement of the respective particles in the detection liquid.

10. The particle measuring method of claim 1, wherein the scattered light is converted into the electric signal by using a photomultiplier tube.

11. The particle measuring method of claim 1, wherein the light includes laser light.

12. The particle measuring method of claim 1, further comprising making the detection liquid flow through a part containing a fluororesin particle.

13. The particle measuring method of claim 12, wherein the part is used for manufacturing semiconductor devices.

14. The particle measuring method of claim 13, wherein the part comprises a pipe, a joint, a valve, a pump or a filter.

15. The particle measuring method of claim 12, wherein the detection liquid is stored in a tank that is subjected to nitrogen gas sealing before the detection liquid flows through the part.

* * * * *